Dec. 12, 1950          F. COHEN              2,533,222
            CHRISTMAS TREE LIGHTING SYSTEM
                 Filed Feb. 18, 1946

FELIX COHEN
INVENTOR.

BY
H. A. McGrew
ATTORNEY

Patented Dec. 12, 1950

2,533,222

UNITED STATES PATENT OFFICE 2,533,222

CHRISTMAS TREE LIGHTING SYSTEM

Felix Cohen, Denver, Colo.

Application February 18, 1946, Serial No. 648,457

4 Claims. (Cl. 240—10)

This invention relates to lighting devices, and more particularly to a device useful in the ornamentation, as by electric lights, of Christmas trees and the like.

Christmas tree lights at present comprise relatively long wire strands having sockets at spaced intervals, into which bulbs are screwed, the bulbs normally being of various colors. Each strand is wound in a relatively circuitous fashion about the Christmas tree, and it is often difficult to supply current to the various strands, when more than one strand is used, without the use of cumbersome extension cords or the like. Also, the fact that the strands of lights must be wound about the tree often precludes the most advantageous placement of the lights, and increases the possibility of damage to or breakage of the bulbs.

Among the objects of this invention are to provide an improved lighting device especially useful in attaching ornamental lights to a Christmas tree or the like; to provide such a device which is capable of attachment to a variety of sizes and shapes of trees or the like; to provide such a lighting device which is readily attached to, or detached from, a tree; to provide such a lighting device which permits the use of shorter strands of lights and therefore permits a more desirable placement of the lights; and especially to provide such a lighting device which is simple in construction and use.

Other objects, and the novel features of this invention, will become apparent from the following description, taken in connection with the accompanying drawing, in which.

Figure 1:
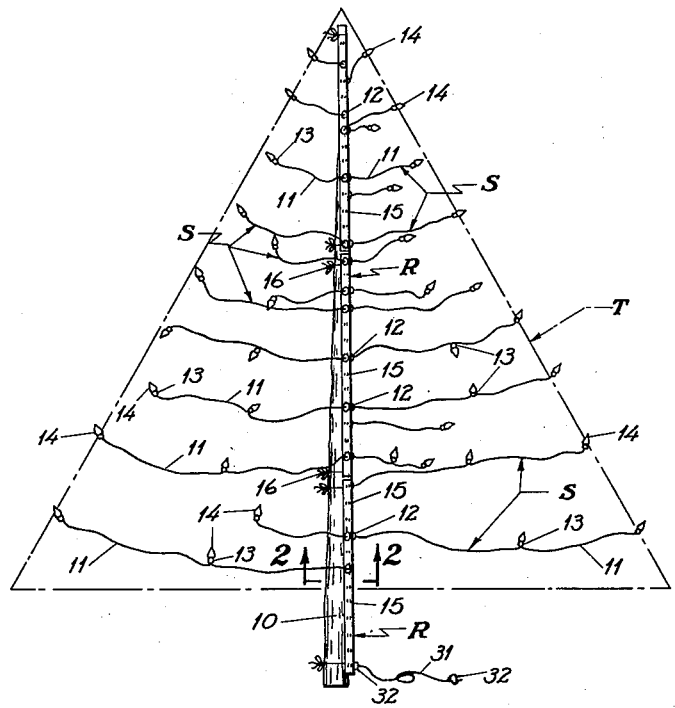
Fig. 1 is a front elevation of a Christmas tree, shown diagrammatically, on which is placed a lighting device constructed in accordance with this invention.

The lighting device of this invention is attached to a tree T, such as an evergreen tree which is to be ornamented by lights and other decorations, as at Christmas time. The device comprises one or more elongated receptacle units R, attached to the trunk 10 of tree T, and from which lead a plurality of strands S. Each strand S consists of a double wire 11 leading from a plug 12 to a plurality of spaced sockets 13, in which are installed bulbs 14. Each receptacle unit R includes a sufficient number of plug connections 15, as in Fig. 1, so that one strand S may be placed along each of the more outstanding branches of the tree, thereby reducing the length and complexity of placement of each strand, although it will be understood that strands of any desired length may be utilized.

The receptacle units R are preferably arcuate in shape and attached to the trunk of the tree in a suitable manner, so that they may be detached and used over again year after year. Suitable attaching means may comprise cords 16, as in Figs. 1 and 2, one pair of cords being provided adjacent each end of each receptacle unit R, the two cords of each pair being tied together, as in a bow knot, for ready separation after a period of use. Alternatively, the receptacle units R may be provided with spring clips 17, as in Fig. 3, adapted to snap over the trunk 10 of the tree T, thereby being readily placeable and removable. Preferably, several receptacle units R are utilized for each tree of normal height, so that only one receptacle unit R, for instance, will be necessary for a small tree to be placed on a table, while additional units are added for larger trees. Thus, the receptacle units may be twelve to sixteen inches in length, or any other desired dimension.

Figure 2:
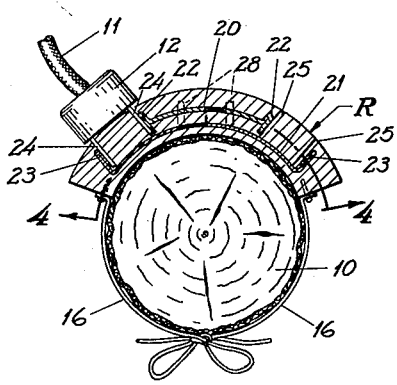
Fig. 2 is a horizontal section, on an enlarged scale, taken along line 2—2 of Fig. 1.
Figure 3:
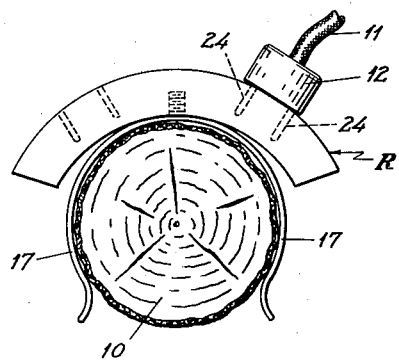
Fig. 3 is a section similar to Fig. 2, illustrating an alternative manner of attaching the device to the trunk of a tree.

Each receptacle unit R, as in Figs. 2 and 3, may be formed of suitable moldable plastic composition which is electrically non-conductive, and in which is embedded curved conductors 20 and 21, conductor 20 supplying current through inner flanges 22 and conductor 21 similarly supplying current through outer flanges 23 to prongs 24 of plug 12. Slots 25 are formed in each receptacle unit R at spaced intervals to complete plug connections 15, while flanges 22 and 23 may be bent over, as shown, to provide a spring effect for reception of prongs 24. Each set of flanges on the conductors coincide vertically, so as to provide two sets of plug connections 15 at each interval. As will be observed, by providing a considerable number of plug connections 15, the number of strands which may be attached to the receptacle units R is considerably more than is ordinarily desired, so that a wide choice of attachment of each strand to the receptacle unit is possible. Thus, each strand may be placed on a limb, or one or more adjacent limbs in any desired manner, since the user knows that the strand may be connected to the receptacle at any point along the trunk of the tree.

Figure 4:
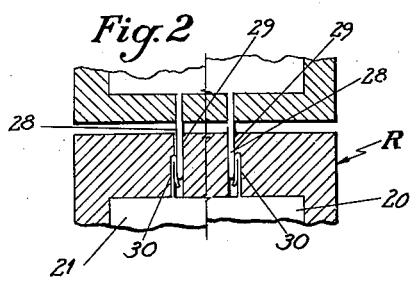
Fig. 4 is a fragmentary vertical section taken along line 4—4 of Fig. 2.

The receptacle units R are connected to each other electrically in a suitable manner. Thus, as in Figs. 2 and 4, radial prongs 28 extend from the lower end of each upper unit R into sockets 29 in the upper end of the receptacle next below. Each prong 28 may be formed by twisting an extension formed at the end of conductor 20 or 21, or attached to the conductor in a suitable manner, as by soldering. Cooperating prongs 30 in sockets 29, as in Fig. 4, may also be formed by twisting extensions of conductors 20 and 21, or attached to the conductors in the same manner as prongs 28.

The lower end of the lowermost receptacle unit R is preferably finished plain, without prongs 28. Electricity may be supplied to the device in any suitable manner, as by a cord 31 provided at each end with a plug 32, one plug 32 being normally inserted in a plug connection 15 near the bottom of the tree, and the other plug 32 being inserted in a household electrical outlet or the like. If desired, cord 31 may be permanently attached at one end to the lowermost receptacle unit R.

If desired, the prongs 28 may extend circumferentially, and a suitable circumferential socket provided in the upper end of the receptacle unit next below, to permit radial adjustment of the receptacle units R with respect to each other. The latter is of particular advantage in the case of a bushy tree having a considerable number of branches, which prevent the receptacle units being installed in a straight line up the trunk. Also, if desired, the receptacle units R may be made of a more flexible material, such as rubber, either natural or synthetic, so as to be able to be bent around branches extending from the trunk. Again, the receptacle units may be provided with a flexible portion at each end, to permit radial adjustment of the units, or a jumper cord of relatively short length, provided with a plug at each end, similar to cord 31 but having a relatively short length, may be used in connecting the adjacent ends of the units together electrically. In the latter instance, the attaching prongs 28 and sockets 29 may be unnecessary, one end of the jumper cord merely being inserted in a plug connection 15 adjacent the upper end of a receptacle unit R, and the other end of the jumper cord being inserted in a plug connection 15 adjacent the lower end of the receptacle unit next above.

From the foregoing, it will be apparent that the lighting device of this invention fulfills to a marked degree the objects and requirements hereinbefore set forth. Improvements of value include elongated receptacle units having a plurality of connections for strands of lights, and also provided with means for attaching the same to the trunk of a tree or the like, as well as a plurality of elongated receptacle units provided with means for electrically connecting the same together, so that any tree, irrespective of size or shape, may be ornamented with ease and facility.

It will be understood that other embodiments of this invention may exist, and that various changes in addition to those indicated may be made, all without departing from the spirit and scope of this invention.

What is claimed is:

1. A lighting assembly comprising a plurality of strands of lights adapted to be placed on a tree or the like, each said strand including an electrically conductive cord having a pronged plug at an end thereof; a plurality of elongated receptacle units of arcuate transverse section, each having a pair of longitudinally extending and spaced conductors embedded in electrically non-conductive material, each said conductor being provided with flanges extending radially into slots formed in said material, said flanges being adapted to contact the prongs of said strand plugs and thereby form a plurality of spaced connections for electrical attachment of said strands to said unit; means for electrically attaching said units together including a prong extending from each conductor and axially from the lower end of each upper unit, and slots and cooperating prongs at the upper end of the unit next below; and means for attaching said units to the trunk of a tree or the like.

2. A lighting assembly comprising a plurality of strands of lights adapted to be placed on a tree or the like, each said strand including an electrically conductive cord having a pronged plug at an end thereof; an elongated receptacle unit of arcuate transverse section having a pair of longitudinally extending and spaced conductors embedded in electrically non-conductive material, each said conductor being provided with flanges extending radially into slots formed in said material, said flanges being adapted to contact the prongs of said strand plugs and thereby form a plurality of spaced connections for electrical attachment of said strands to said unit; and means for attaching said unit to the trunk of a tree or the like.

3. A lighting assembly comprising a plurality of strands of lights adapted to be placed on a tree or the like, each said strand including an electrically conductive cord having a pronged plug at an end thereof; an elongated receptacle unit of arcuate transverse section having a pair of longitudinally extending and spaced conductors embedded in electrically non-conductive material, each said conductor being provided with flanges extending radially into slots formed in said material, said flanges being adapted to contact the prongs of said strand plugs and thereby form a plurality of spaced connections for electrical attachment of said strands to said unit; and a cord or cords for attaching said unit to the trunk of a tree or the like.

4. A lighting device comprising an elongated receptacle unit having a series of spaced plug-in connections arranged longitudinally and transversely of the elongated receptacle unit for strands of lights or the like, said unit being of arcuate transverse section; and means for attaching said unit to an object to be illuminated or decorated.

FELIX COHEN.

REFERENCES CITED

The following references are of record in the file of this patent:

UNITED STATES PATENTS

| Number | Name | Date |
|---|---|---|
| 1,225,241 | Grupe | May 8, 1917 |
| 2,025,214 | Moulthrop | Dec. 24, 1935 |
| 2,219,568 | Stewart | Oct. 29, 1940 |
| 2,354,598 | Janz | July 25, 1944 |